(12) United States Patent
Chauvin et al.

(10) Patent No.: US 12,083,941 B2
(45) Date of Patent: Sep. 10, 2024

(54) VEHICLE HAVING DEPLOYABLE WORK TABLE

(71) Applicant: Ford Global Technologies, LLC, Dearborn, MI (US)

(72) Inventors: Kevin Robert Chauvin, Belleville, MI (US); Brian Robb, Ypsilanti, MI (US); Thomas Junior Luckett, Saline, MI (US); Tariq Ismail, Superior Township, MI (US); Glen D. Skinner, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 172 days.

(21) Appl. No.: 17/898,681

(22) Filed: Aug. 30, 2022

(65) Prior Publication Data
US 2024/0067070 A1 Feb. 29, 2024

(51) Int. Cl.
*B60N 3/00* (2006.01)
*B60R 7/04* (2006.01)

(52) U.S. Cl.
CPC .............. *B60N 3/002* (2013.01); *B60R 7/04* (2013.01)

(58) Field of Classification Search
CPC .................................. B60N 3/002; B60R 7/04
See application file for complete search history.

(56) References Cited

U.S. PATENT DOCUMENTS

| 7,293,507 B2 | 11/2007 | DePue et al. |
| 8,496,295 B2 | 7/2013 | Chen |
| 9,896,011 B2 | 2/2018 | Kong et al. |
| 10,632,933 B2 | 4/2020 | Line et al. |
| 10,906,446 B2 | 2/2021 | Gaines et al. |
| 2021/0024013 A1* | 1/2021 | Quesnel ................. B60N 2/753 |
| 2022/0105850 A1* | 4/2022 | Turletti .................. B60N 3/004 |

FOREIGN PATENT DOCUMENTS

| DE | 20020072 U1 * | 4/2002 | ............ B60N 2/468 |
| JP | 2005193855 A | 7/2005 | |
| JP | 5715268 B2 | 3/2015 | |

* cited by examiner

*Primary Examiner* — Matthew W Ing
(74) *Attorney, Agent, or Firm* — Vichit Chea; Price Heneveld LLP (57) ABSTRACT

A vehicle includes a support structure, a base supported on the support structure, a table supported on the base and movable relative to the base, and first and second arcuate cam slots provided on one of the base and the table. The vehicle also includes first and second pivot pins provided on the other of the base and the table and operatively coupled to the first and second arcuate cam slots and a locking mechanism configured to lock one of the pivot pins in a position to prevent one pivot pin from sliding within the arcuate cam slots and to allow the one pivot pin to rotate while the other of the first and second pivot pins slides within the corresponding arcuate cam slot to rotate the table to a use position.

18 Claims, 7 Drawing Sheets

VEHICLE HAVING DEPLOYABLE WORK TABLE

FIELD OF THE DISCLOSURE

The present disclosure generally relates to passenger vehicles, and more particularly relates to a work table that is deployable within the cabin interior of a vehicle.

BACKGROUND OF THE DISCLOSURE

Motor vehicles are commonly configured with a cabin interior having passenger seating for transporting passengers. In some situations, passengers may want a workspace in the vehicle. It would be desirable to provide for a convenient way to store and deploy a work surface within the cabin compartment.

SUMMARY OF THE DISCLOSURE

According to a first aspect of the present disclosure, a vehicle is provided and includes a support structure, a base supported on the support structure, a table supported on the base and movable relative to the base, and first and second arcuate cam slots provided on one of the base and the table. The vehicle also includes first and second pivot pins provided on the other of the base and the table and operatively coupled to the first and second arcuate cam slots, respectively, and a locking mechanism configured to lock the first pivot pin in a locked position to prevent the first pivot pin from sliding within the first arcuate cam slot and to allow the first pivot pin to rotate while the second pivot pin slides within the second arcuate cam slot to rotate the table to a use position.

Embodiments of the first aspect of the present disclosure can include any one or a combination of the following features:
- the locking mechanism is further configured to lock the second pivot pin in a locked position to prevent the second pivot pin from sliding within the second arcuate cam slot and to allow the second pivot pin to rotate while the first pivot pin slides within the first arcuate slot;
- the support structure comprises a center console;
- a driver seat and a passenger seat, wherein the center console is disposed between the driver seat and the passenger seat;
- the base and table are located on a cover assembly of the center console;
- the cover assembly comprises a cover configured to be located on top of the table in a stowed position;
- the cover is configured to pivot about a hinge between the stowed position and a use position;
- the table rotates between a first use to a second use position proximate to the passenger seat and further rotates between the first use position to a third use position proximate to the driver seat;
- the first and second arcuate cam slots are non-intersecting; and
- the first and second cam slots are located on a surface of the base and the first and second pivot pins are located on a surface of the table.

According to a second aspect of the present disclosure, a vehicle is provided and includes a center console, a base supported on the center console, a table supported on the base and movable relative to the base, first and second arcuate cam slots provided on one of the base and the table, and first and second pivot pins provided on the other of the base and the table and operatively coupled to the first and second arcuate cam slots, respectively. The vehicle also includes a locking mechanism configured to lock the first pivot pin in a locked position to prevent the first pivot pin from sliding within the first arcuate cam slot and to allow first pivot pin to rotate while the second pivot pin slides within the second arcuate cam slot to rotate the table to a use position, wherein the locking mechanism is further configured to lock the second pivot pin in a locked position to prevent the second pivot pin from sliding within the second arcuate cam slot and to allow the second pivot pin to rotate while the first pivot pin slides within the first arcuate slot, and wherein the table rotates between a first use to a second use position proximate to the passenger seat and further rotates between the first use position to a third use position proximate to the driver seat.

Embodiments of the second aspect of the present disclosure can include any one or a combination of the following features:
- the base and table are located on a cover assembly of the center console;
- the cover assembly comprises a cover configured to be located on top of the table in a stowed position;
- the first and second arcuate cam slots are non-intersecting; and
- the first and second cam slots are located on a surface of the base and the first and second pivot pins are located on a surface of the table.

According to a third aspect of the present disclosure, a center console for a vehicle is provided. The center console includes a housing, a base supported on the housing, a table supported on the base and movable relative to the base, and first and second arcuate cam slots provided on one of the base and the table. The center console also includes first and second pivot pins provided on the other of the base and the table and operatively coupled to the first and second arcuate cam slots, respectively, and a locking mechanism configured to lock the first pivot pin in a locked position to prevent the first pivot pin from sliding within the first arcuate cam slot and to allow first pivot pin to rotate while the second pivot pin slides within the second arcuate cam slot to rotate the table to a use position.

Embodiments of the third aspect of the present disclosure can include any one or a combination of the following features:
- the locking mechanism is further configured to lock the second pivot pin in a locked position to prevent the second pivot pin from sliding within the second arcuate cam slot and to allow the second pivot pin to rotate while the first pivot pin slides within the first arcuate slot;
- the center console is configured to be disposed between a driver seat and a passenger seat in the vehicle;
- the base and table are located on a cover assembly of the center console, wherein the cover assembly comprises a cover configured to be located on top of the table in a stowed position, and wherein the cover is configured to pivot about a hinge between the stowed position and a use position; and
- the table rotates between a first use position and a second use position proximate to the passenger seat and further rotates between the first use position to a third use position proximate to the driver seat.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

Figure 1:
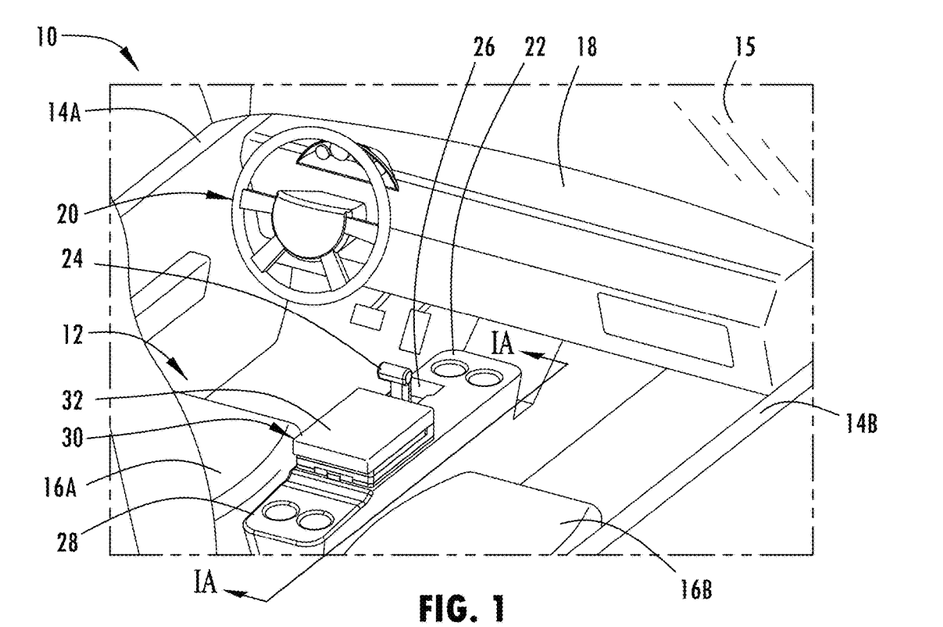
FIG. 1 is a perspective view of a front portion of a cabin interior of a motor vehicle having a deployable table stowed within a cover assembly of a center console, according to one embodiment.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having a deployable table. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated configured with passenger seating and accommodations for transporting one or more passengers including a driver of the vehicle 10. The motor vehicle 10 has a vehicle body that generally defines a cabin interior 12. The cabin interior 12 may contain various features and trim components within the vehicle body. The cabin interior 12 is shown having an arrangement of passenger seats including a first driver seat 16A and a second passenger seat 16B which may be configured as captain seats, for example, arranged as a front row of seats. The vehicle 10 may also include additional seating such as a second row and further rows of seating as is common for a typical large SUV, van or bus. It should be appreciated that the vehicle 10 may be a motor vehicle, such as a wheeled car, truck, SUV, van or bus, for example, or an airplane, train, boat or other vehicle capable of transporting one or more passengers.

The motor vehicle 10 is illustrated having the driver seat 16A located rearward of a front dashboard 18 that generally defines an interior trim panel component generally located at or proximate to a front portion of the cabin interior 12 which is generally vehicle-rearward of a front windshield 15. The dashboard 18 may include various trim panel components and instruments and may also be referred to as an instrument panel. Located vehicle-forward of the driver seat 16A and rearward of the dashboard 18 is a steering wheel 20 which has a steering column and steering rim configured to be engaged by a driver seated in the driver seat 16A and rotated to steer vehicle wheels and hence the vehicle 10.

The driver seat 16A is located on one side of the vehicle proximate to a driver side entry door 14A. The vehicle also has a passenger seat 16B located on the opposite lateral side proximate to a passenger side entry door 14B. Located between the driver seat 16A and passenger seat 16B is a center console 22 which generally extends forward to or proximate to the dashboard 18 and rearward towards a rear row of seating where the rear end of the center console 22 may have cupholders and controls that may be accessed by passengers seated in the rear row of seating. The center console 22 may include a plurality of cupholders both at the front and rear ends thereof. In addition, the center console 22 is shown having a transmission shifter 24 that generally extends upward in a use position and a recessed compartment 26 located forward thereof to receive the shifter 24 in a non-use stowed position. As such the shifter 24 may be rotated forward and downward into the compartment 26 to the stowed position when the shifter 24 is not operable, such as when the vehicle is not operating.

Figure 1A:
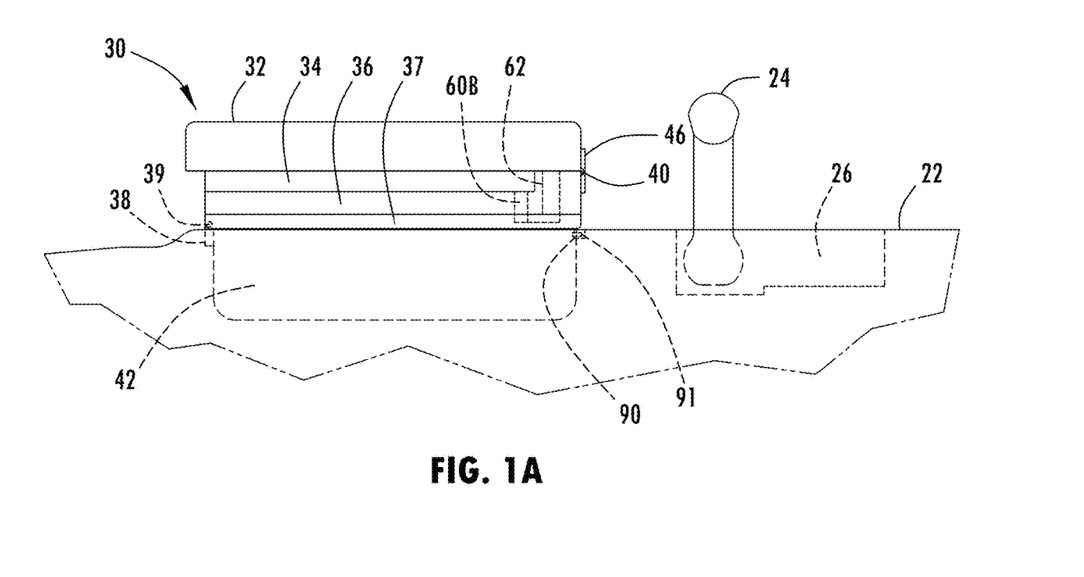
FIG. 1A is a cross-sectional view taken through line IA-IA of FIG. 1 further illustrating the deployable table stowed within the cover assembly in the stowed position.
Figure 1B:
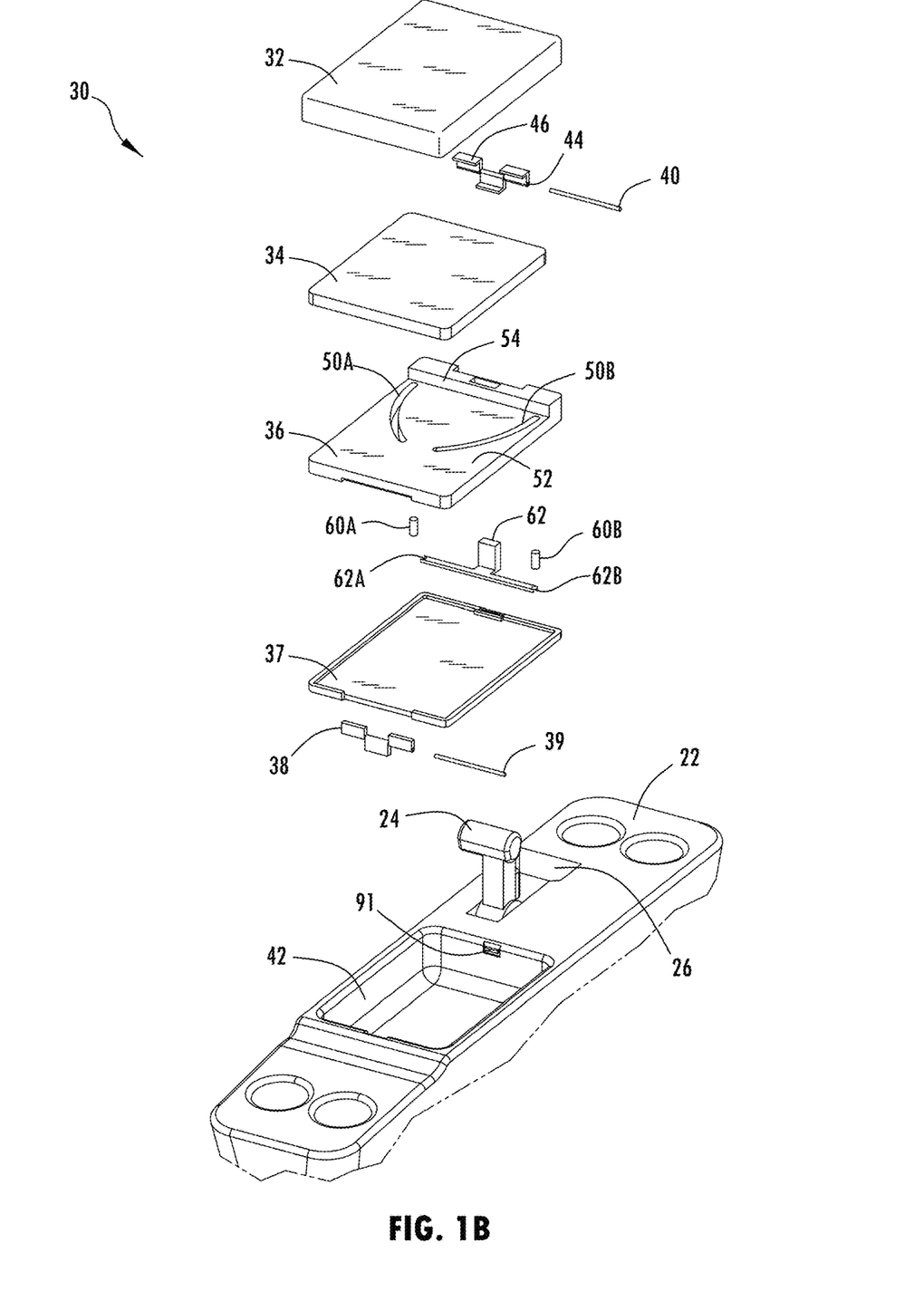
FIG. 1B is an exploded view of the deployable table assembled to the cover assembly and center console shown in FIG. 1.

The center console 22 further includes a cover assembly 30 that covers a storage compartment 42 that generally extends downward into the housing of the center console 22 below the cover assembly 30. With reference to FIGS. 1A and 1B, the cover assembly 30 is shown pivotally connected at a rear end thereof to the housing of the center console 22 via a rear hinge 38 having a hinge pin 39 which allows the cover assembly 30 to pivot upward and rearward from a latched closed position to an unlatched open console position to allow access to the storage compartment 42.

Figure 2:
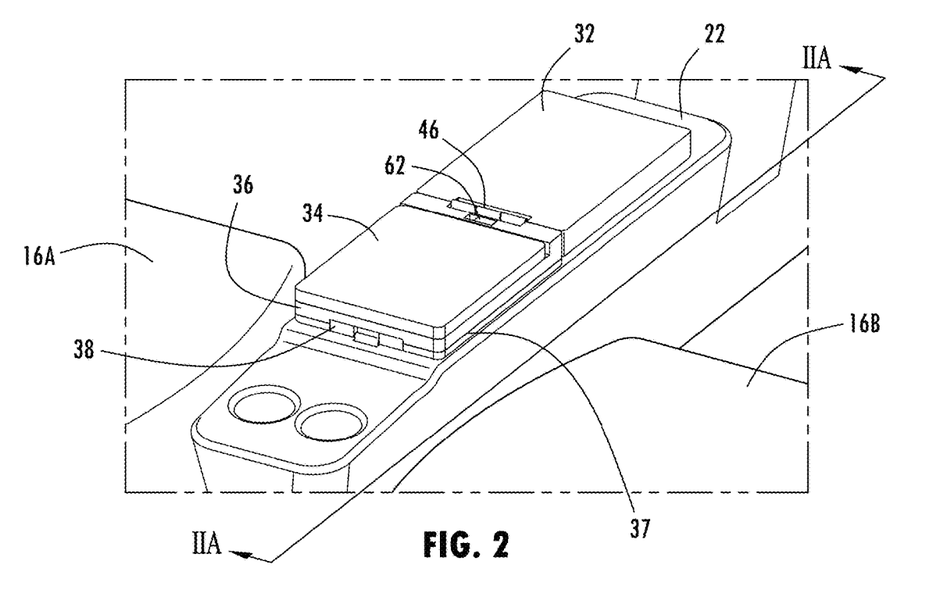
FIG. 2 is a perspective view of the center console showing the deployable table in a first use position.
Figure 2A:
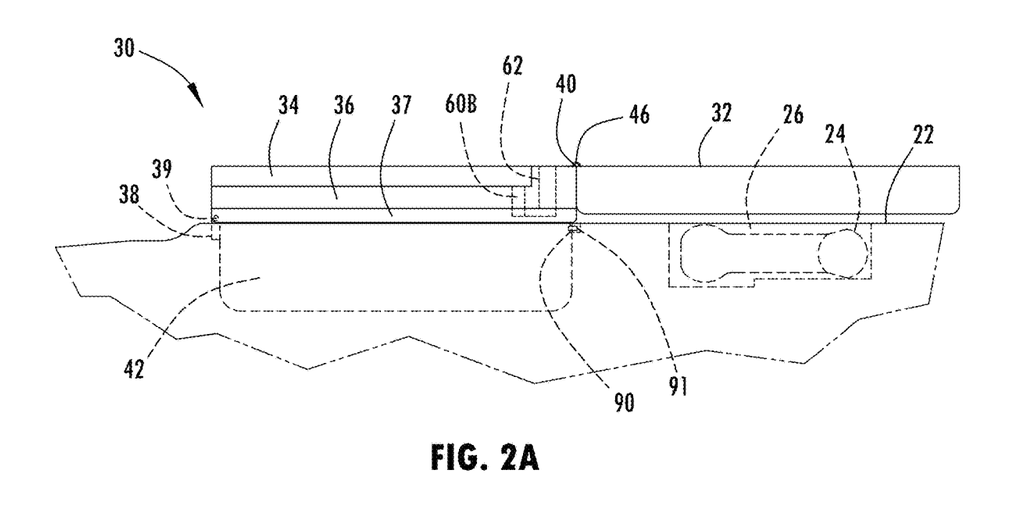
FIG. 2A is a cross-sectional view taken through line IIA-IIA of FIG. 2 further illustrating the deployable table centered on a base in the first use position.

The cover assembly 30 includes a cover 32 on the top side thereof. The cover 32 may serve as an armrest which has a cushioned and upholstered upper surface, according to one example. The cover 32 is coupled at the front end to the cover assembly via a front hinge 46 which has a hinge pin 40 and allows the cover 32 to pivot upward and forward about the front hinge 40 to a second position as seen in FIGS. 2 and 2A. The cover 32 may pivot to a horizontal position when the transmission shifter 24 is stowed in recess 26 in the stowed position. In the second position, the cover assembly 30 is shown having an exposed deployable table 34 operably coupled on top of a base 36. As such, the cover assembly 30 serves as a support structure to support the deployable table 34.

The cover assembly 30 houses the deployable table 34 and underlying base plate 36 when in the non-use position of the deployable table 34. A floor 37 lies underneath base 36 and supports the base 36 and a lock mechanism 62. In order for the deployable table 34 to be positioned in one of a plurality of use positions, the cover 32 is pivoted about hinge 46 to a table use position.

The deployable table 34 has a rectangular shape in the example shown and is shown in a first use position in FIGS. 2 and 2A generally centered upon the base 36 which has a similar size and rectangular shape. It should be appreciated that the deployable table 34 may have other shapes and sizes. The deployable table 34 provides a top work surface which a user may utilize as a work table. The bottom side of the deployable table 34 has first and second pivot pins 60A and 60B that are spaced apart and configured to matingly engage respective first and second arcuate cam slots 50A and 50B formed in the top surface 52 of the base 36, according to the embodiment shown. The first pivot pin 60A engages a first arcuate cam slot 50A and the second pivot pin 60B engages the second arcuate cam slot 50B. The first and second arcuate cam slots 50A and 50B are arcuate shaped recessed slots each curving inward from a front stop wall 54 extending rearward in the vehicle as seen in the deployed position. The first and second arcuate cam slots 50A and 50B are non-intersecting in the example shown. However, it should be appreciated that the first and second arcuate cam slots 50A and 50B conceivably could intersect according to other embodiments.

Disposed proximate to and extending below the base 36 is a user actuatable lock mechanism 62 which includes an arcuate contact surface 62A configured to be able to engage first pivot pin 60A in a first lock position and a second arcuate contact surface 62B configured to engage the second pivot pin 60B in a second lock position. A user may slide the lock mechanism 62 between the first position on the left side and the second position on the right side to engage one of the pivot pins at a time which prevents movement of the corresponding pivot pin within the corresponding arcuate cam slot but allows rotation of the locked pivot pin to enable the deployable table 34 to rotate as the other unlocked pivot pin slides within the other arcuate cam slot.

Figure 2B:
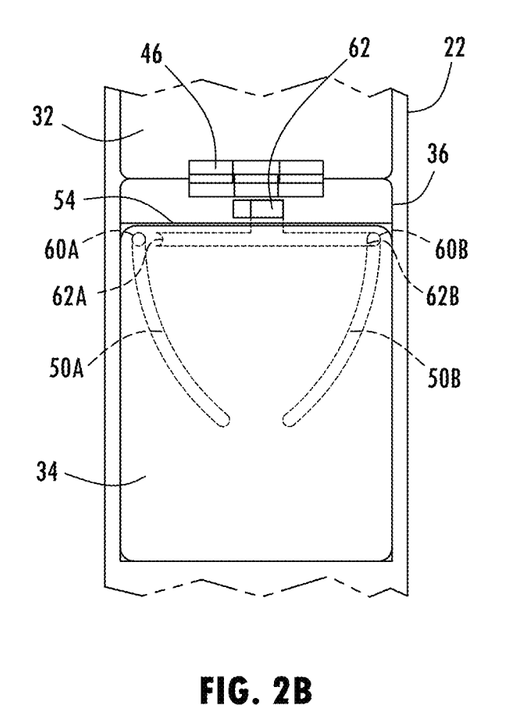
FIG. 2B is a top view of the deployable table shown centered on the base in the first use position.
Figure 3:
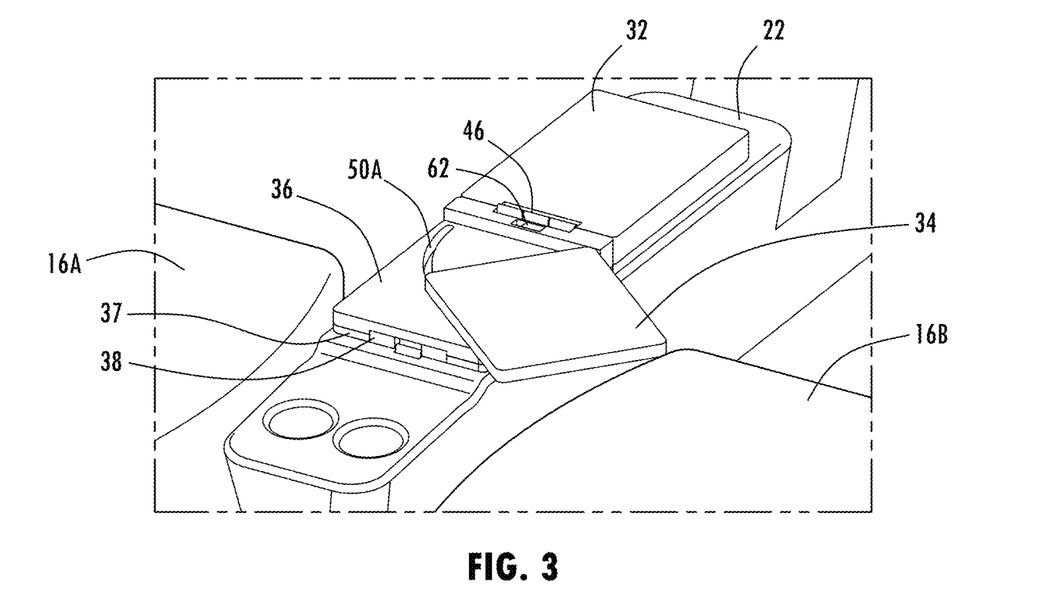
FIG. 3 is a perspective view of the center console showing the deployable table rotated to one side to a second use position.
Figure 3A:
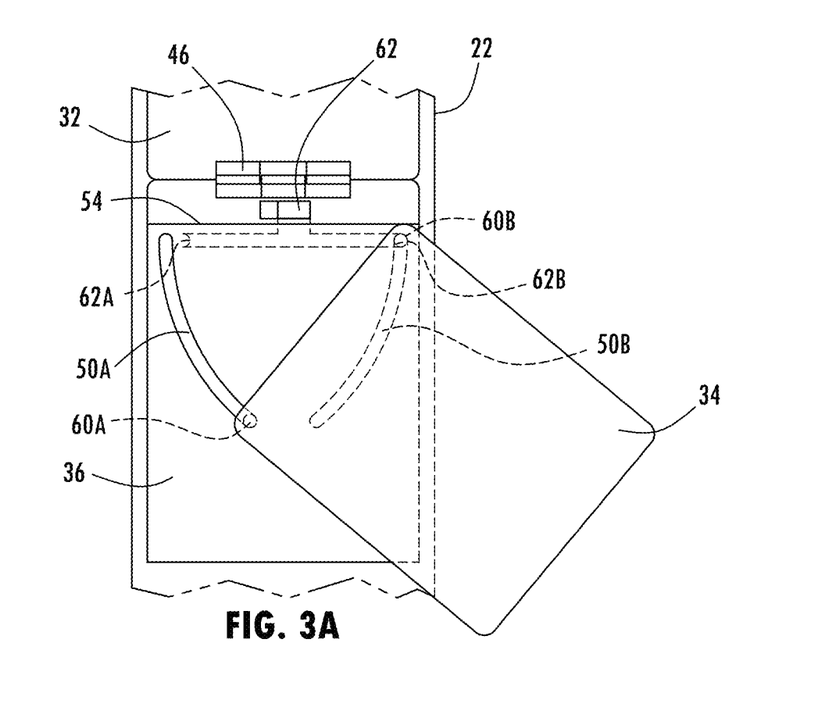
FIG. 3A is a top view of the deployable table shown rotated to one side in the second use position.

The deployable table 34 may be positioned in a first use position as shown in FIGS. 2 and 2B generally centered upon the base 36. With the lock mechanism 62 moved linearly to the right side, the second pivot pin 60B is engaged and locked by the contact surface 62B to prevent the second pivot pin 60B from sliding within the arcuate cam slot 50B while allowing rotating of the locked second pivot pin 60B. As a result, the deployable table 34 may be rotated from the first use position shown in FIGS. 2 and 2B to a second use position shown in FIGS. 3 and 3A in which the deployable table 34 is rotated towards the passenger seat 16B. In this position, the second pivot pin 60B is engaged by contact surface 62B of the lock mechanism 62 while the first pivot pin 60A slides vehicle rearward within the first arcuate cam slot 50A to rotate the deployable table 34. In this position, the deployable table 34 is positioned at least partially in front of the passenger seated in passenger seat 16B.

Figure 4:
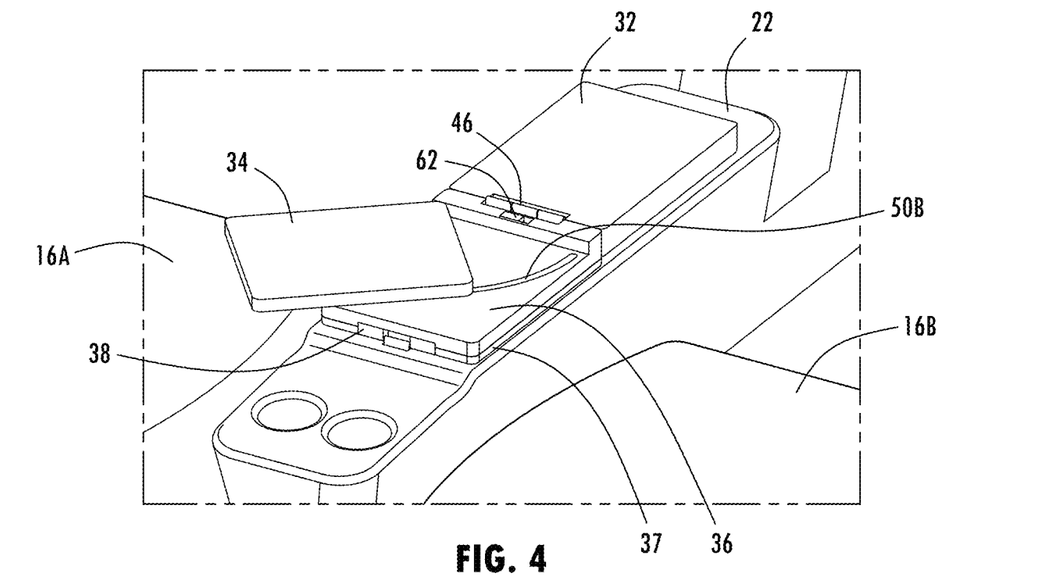
FIG. 4 is a perspective view of the center console showing the deployable table rotated to an opposite side to a third use position.
Figure 4A:
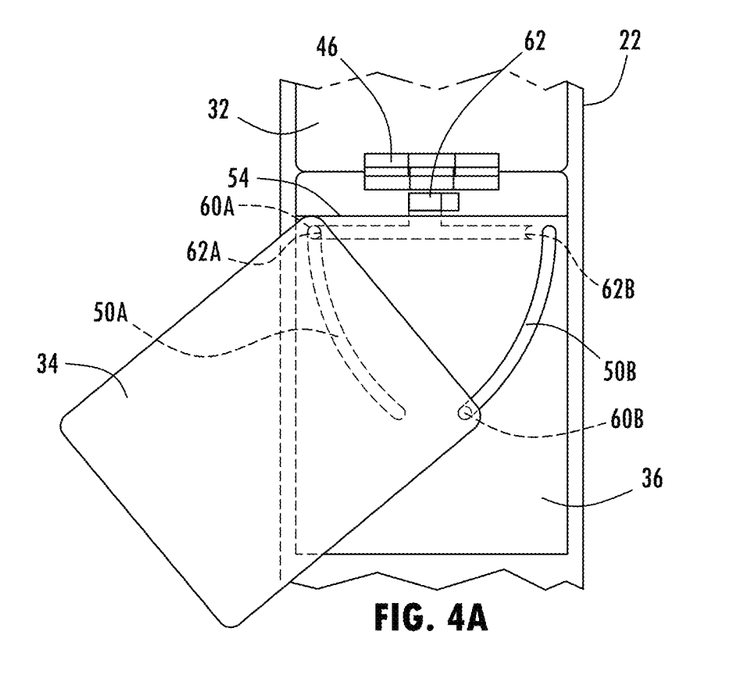
FIG. 4A is a top view of the deployable table shown rotated to the opposite side in the third use position.

The deployable table 34 may further be rotated from the first use position to a third use position as shown in FIGS. 4 and 4A. In this position, the deployable table 34 is positioned at least partially in front of or closer to the driver seat 16A. In doing so, the lock mechanism 62 may be moved to the left side to a positon such that the contact surface 62A engages the first pivot pin 60A to prevent sliding of the first pivot pin 60A within first arcuate cam slot 50A, but allows rotation of the first pivot pin 60A. At the same time, the second pivot pin 60B is allowed to slide vehicle-rearward within the second arcuate cam slot 50B such that the deployable table 34 moves rearward and rotates towards the side of the driver's seat 16A. It should be appreciated that the deployable table 34 may be moved from the first position to either of the first and second positions, according to one example. It should further be appreciated that the deployable table 34 may be moved to other positions between the extreme first, second and third use positions shown.

It should be appreciated that the deployable table 34 when deployed in front of a driver in driver seat 16A, requires that the vehicle 10 be parked and not moving. It is anticipated that technology and the regulatory framework may evolve in the future to where using the deployable table 34 in a moving vehicle becomes safe and permissible.

Figure 5:
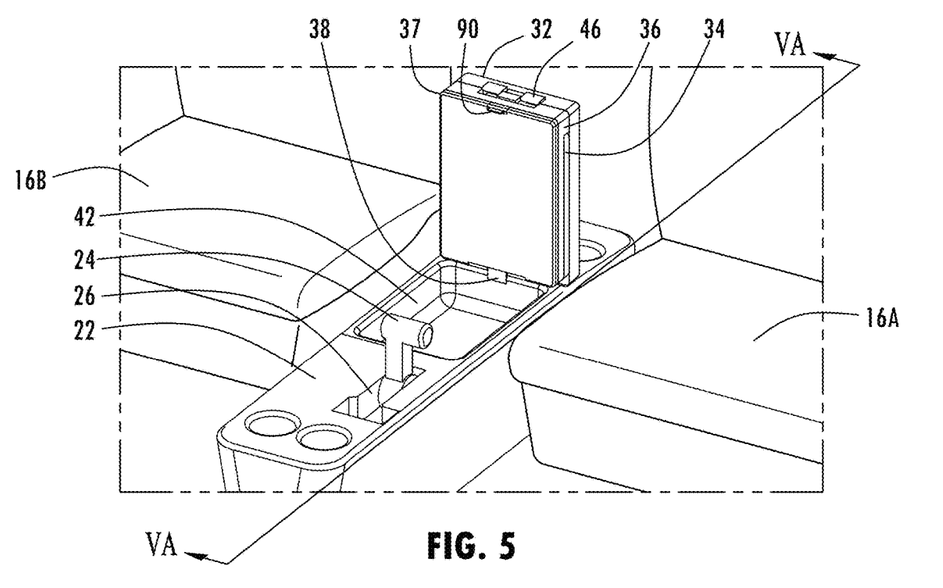
FIG. 5 is a perspective view of the center console with the cover assembly shown in an open console position.
Figure 5A:
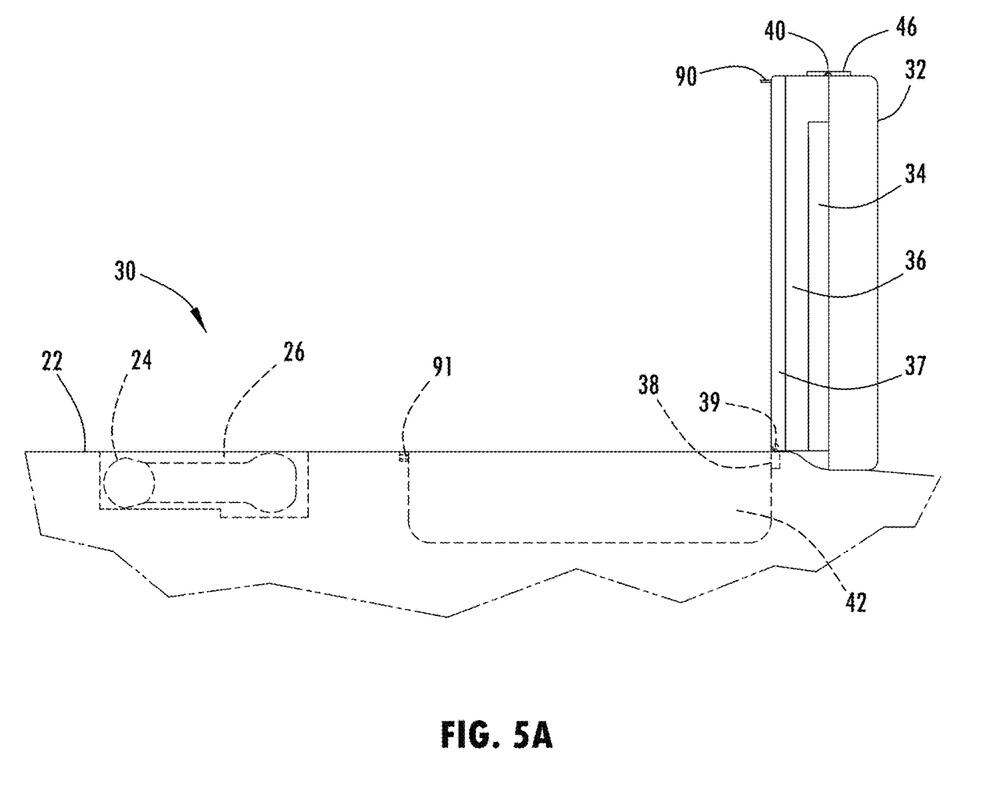
FIG. 5A is a cross-sectional view taken through line V-V of FIG. 5 further illustrating the cover assembly in the open console position.

Referring to FIGS. 5 and 5A, the cover assembly 30 is shown in an open console position pivoted upward about hinge 38 to an upright or vertical position when latch 90 is unlatched. With the cover assembly 30 in the open console position, the storage compartment 42 is exposed and accessible to access. Accordingly, the cover assembly 30 advantageously provides a hinged cover for the storage compartment 42 and stores or supports the deployable table 34.

Accordingly, a vehicle 10 is advantageously provided with a deployable table 34 that may deployed from a support structure, such as a center console cover assembly 30, according to one example. The deployable table 34 may be moved amongst a plurality of positions by sliding the deployable table 34 relative to a base 36 with first and second pivot pins on the deployable table 34 engaging first and second arcuate cam slots on the base 36, according to one example. However, it should be appreciated that the first and second pivot pins may otherwise be located on a top surface of the base 36 and the first and second arcuate cam slots may be located on an underside of the deployable table 34, according to another embodiment.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:
   a support structure;
   a base supported on the support structure;
   a table supported on the base and movable relative to the base;
   first and second arcuate cam slots provided on one of the base and the table and extending within a common horizontal plane that is parallel to a plane of the table, wherein the first and second arcuate cam slots are non-intersecting;
   first and second pivot pins provided on the other of the base and the table extending within the common horizontal plane and operatively coupled to the first and second arcuate cam slots, respectively; and
   a locking mechanism configured to lock the first pivot pin in a locked position to prevent the first pivot pin from sliding within the first arcuate cam slot and to allow the first pivot pin to rotate while the second pivot pin slides within the second arcuate cam slot to rotate the table to a use position.

2. The vehicle of claim 1, wherein the locking mechanism is further configured to lock the second pivot pin in a locked position to prevent the second pivot pin from sliding within the second arcuate cam slot and to allow the second pivot pin to rotate while the first pivot pin slides within the first arcuate cam slot.

3. The vehicle of claim 1, wherein the support structure comprises a center console.

4. The vehicle of claim 3 further comprising a driver seat and a passenger seat, wherein the center console is disposed between the driver seat and the passenger seat.

5. The vehicle of claim 4, wherein the base and table are located on a cover assembly of the center console.

6. The vehicle of claim 5, wherein the cover assembly comprises a cover configured to be located on top of the table in a stowed position.

7. The vehicle of claim 6, wherein the cover is configured to pivot about a hinge between the stowed position and a use position.

8. The vehicle of claim 7, wherein the table rotates between a first use to a second use position proximate to the passenger seat and further rotates between the first use position to a third use position proximate to the driver seat.

9. The vehicle of claim 1, wherein the first and second arcuate cam slots are located on a surface of the base and the first and second pivot pins are located on a surface of the table.

10. A vehicle comprising:
    a center console;
    a base supported on the center console;
    a table supported on the base and movable relative to the base;
    first and second arcuate cam slots provided on one of the base and the table and extending within a common horizontal plane that is parallel to a plane of the table, wherein the first and second arcuate cam slots are non-intersecting;
    first and second pivot pins provided on the other of the base and the table extending within the common horizontal plane and operatively coupled to the first and second arcuate cam slots, respectively; and
    a locking mechanism configured to lock the first pivot pin in a locked position to prevent the first pivot pin from sliding within the first arcuate cam slot and to allow first pivot pin to rotate while the second pivot pin slides within the second arcuate cam slot to rotate the table to a use position, wherein the locking mechanism is further configured to lock the second pivot pin in a locked position to prevent the second pivot pin from sliding within the second arcuate cam slot and to allow the second pivot pin to rotate while the first pivot pin slides within the first arcuate cam slot, and wherein the table rotates between a first use to a second use position proximate to a passenger seat and further rotates between the first use position to a third use position proximate to a driver seat.

11. The vehicle of claim 10, wherein the base and table are located on a cover assembly of the center console.

12. The vehicle of claim 11, wherein the cover assembly comprises a cover configured to be located on top of the table in a stowed position.

13. The vehicle of claim 10, wherein the first and second arcuate cam slots are located on a surface of the base and the first and second pivot pins are located on a surface of the table.

14. A center console for a vehicle, the center console comprising:
a housing;
a base supported on the housing;
a table supported on the base and movable relative to the base;
first and second arcuate cam slots provided on one of the base and the table and extending within a common horizontal plane that is parallel to a plane of the table, wherein the first and second arcuate cam slots are non-intersecting;
first and second pivot pins provided on the other of the base and the table extending within the common horizontal plane and operatively coupled to the first and second arcuate cam slots, respectively; and
a locking mechanism configured to lock the first pivot pin in a locked position to prevent the first pivot pin from sliding within the first arcuate cam slot and to allow first pivot pin to rotate while the second pivot pin slides within the second arcuate cam slot to rotate the table to a use position.

15. The center console for a vehicle of claim 14, wherein the locking mechanism is further configured to lock the second pivot pin in a locked position to prevent the second pivot pin from sliding within the second arcuate cam slot and to allow the second pivot pin to rotate while the first pivot pin slides within the first arcuate cam slot.

16. The center console for a vehicle of claim 14, wherein the center console is configured to be disposed between a driver seat and a passenger seat in the vehicle.

17. The center console for a vehicle of claim 16, wherein the base and table are located on a cover assembly of the center console, wherein the cover assembly comprises a cover configured to be located on top of the table in a stowed position, and wherein the cover is configured to pivot about a hinge between the stowed position and a use position.

18. The center console for a vehicle of claim 17, wherein the table rotates between a first use position and a second use position proximate to the passenger seat and further rotates between the first use position to a third use position proximate to the driver seat.

* * * * *